Oct. 6, 1931.  H. D. MUNDAY  1,825,676
METHOD AND MEANS FOR TRUING COMMUTATORS
Filed May 18, 1928  6 Sheets-Sheet 1
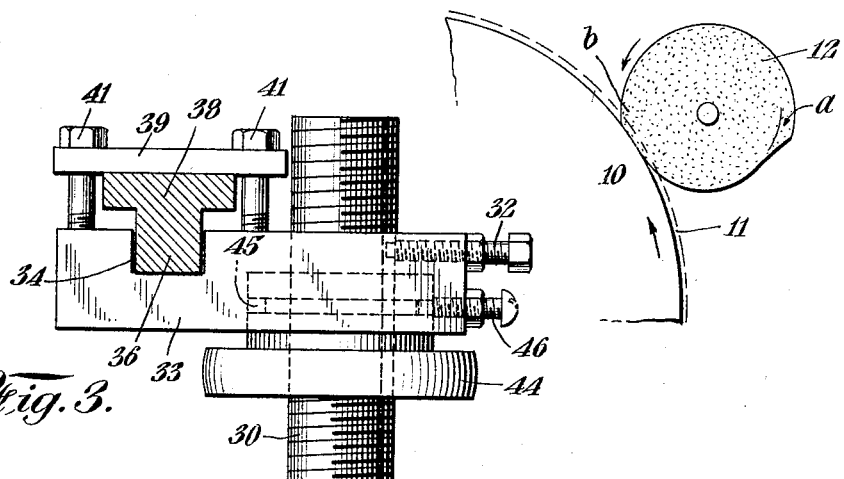
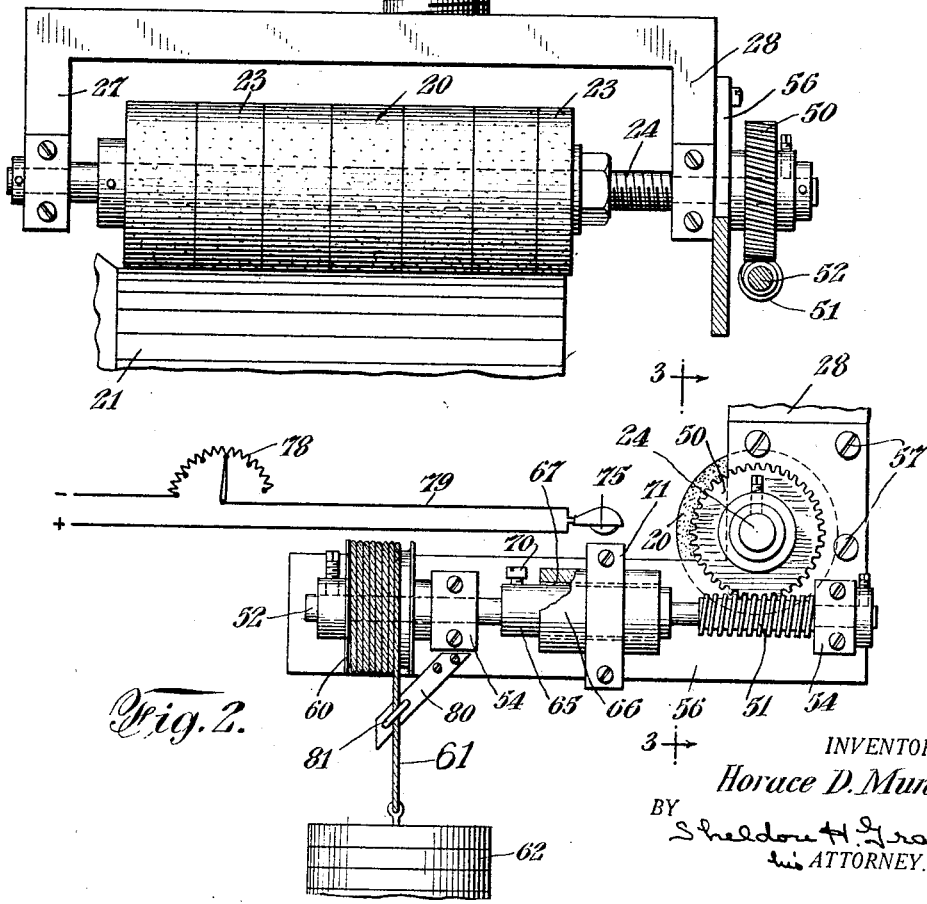
INVENTOR.
Horace D. Munday
BY Sheldon H. Graves
his ATTORNEY.

Oct. 6, 1931.  H. D. MUNDAY  1,825,676
METHOD AND MEANS FOR TRUING COMMUTATORS
Filed May 18, 1928   6 Sheets-Sheet 2
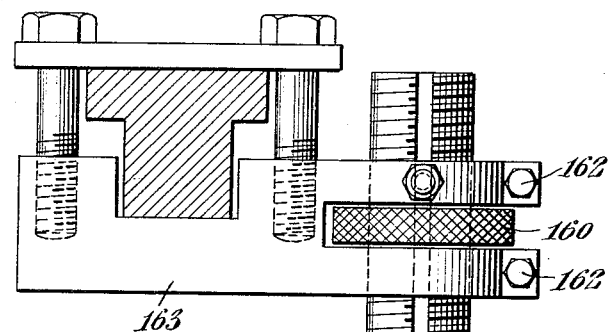
Fig. 4.
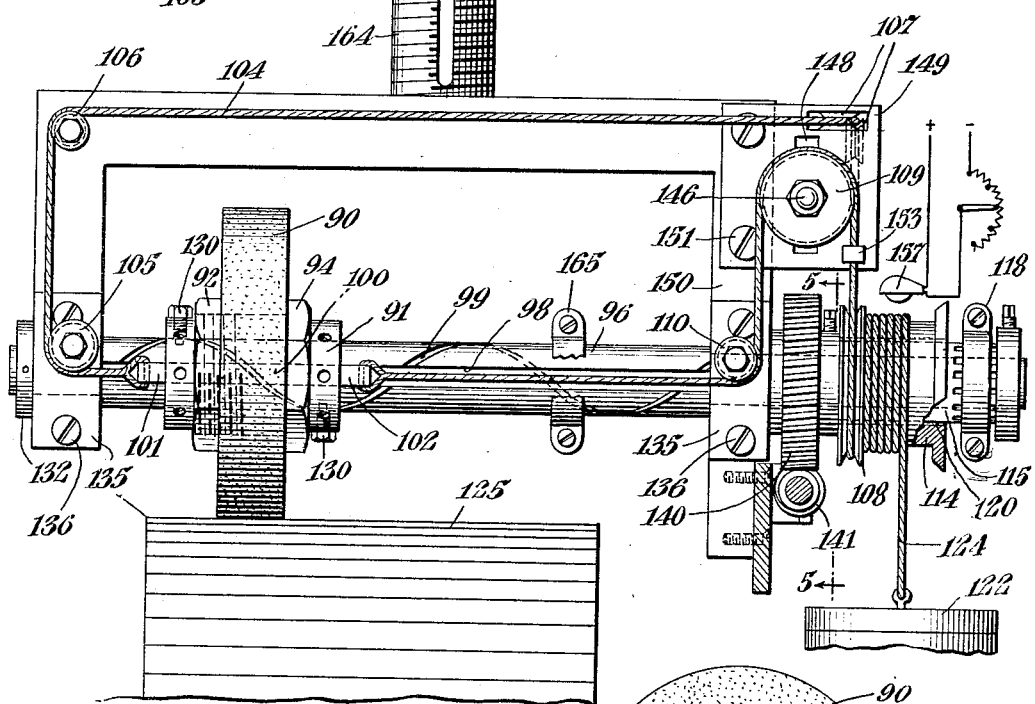
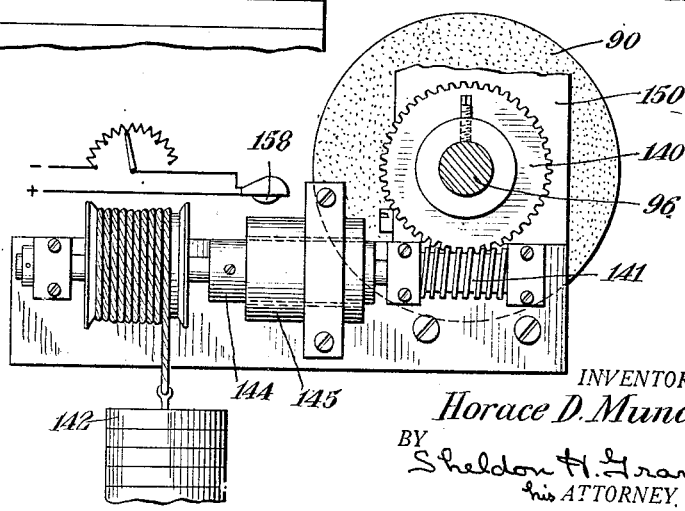
Fig. 5.
INVENTOR.
Horace D. Munday
BY Sheldon H. Graves
his ATTORNEY Oct. 6, 1931.  H. D. MUNDAY  1,825,676
METHOD AND MEANS FOR TRUING COMMUTATORS
Filed May 18, 1928   6 Sheets-Sheet 3
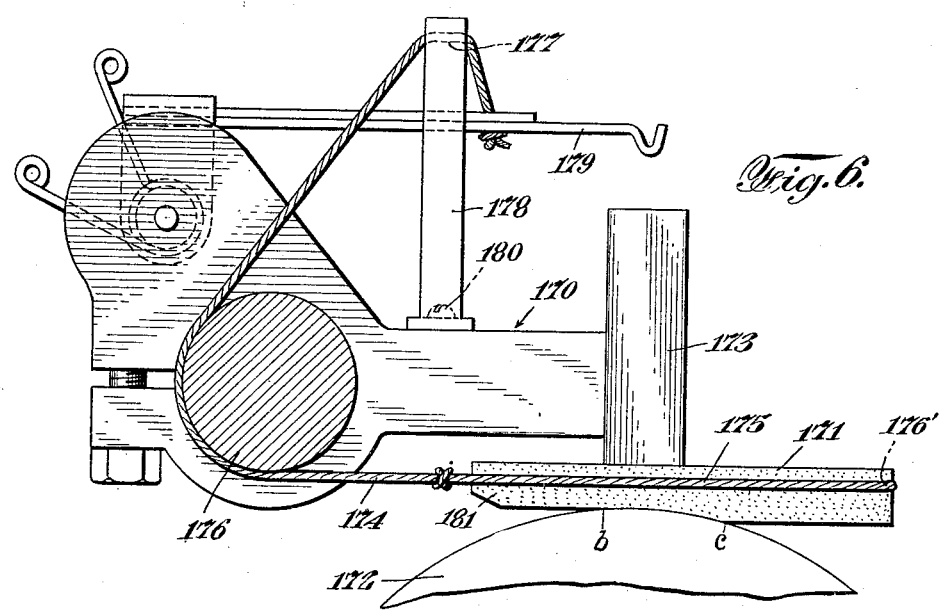
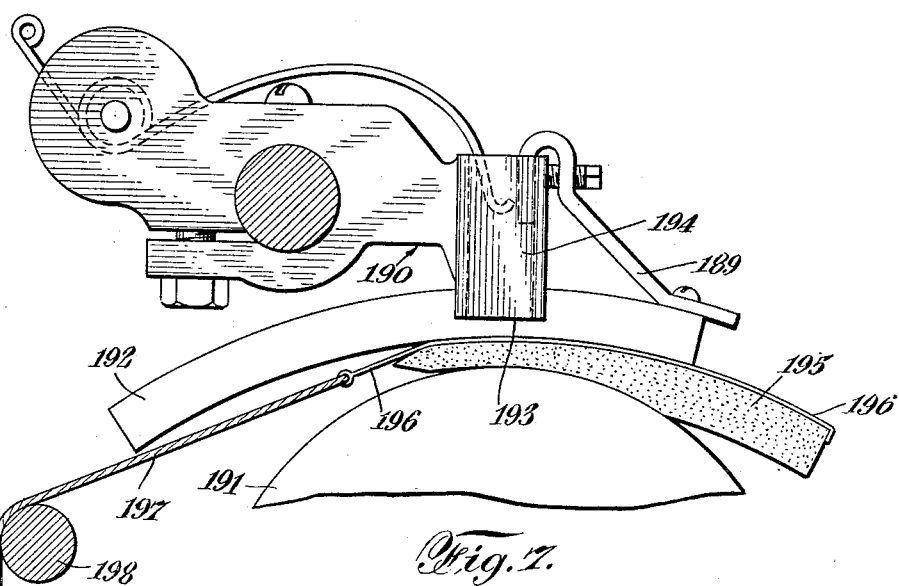
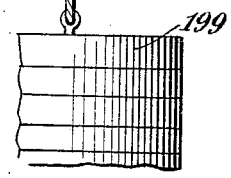
Inventor
Horace D. Munday
By his Attorney
Sheldon H. Graves.

Oct. 6, 1931. H. D. MUNDAY 1,825,676
METHOD AND MEANS FOR TRUING COMMUTATORS
Filed May 18, 1928 6 Sheets-Sheet 4

Inventor
Horace D. Munday
Sheldon H. Graves
Attorney

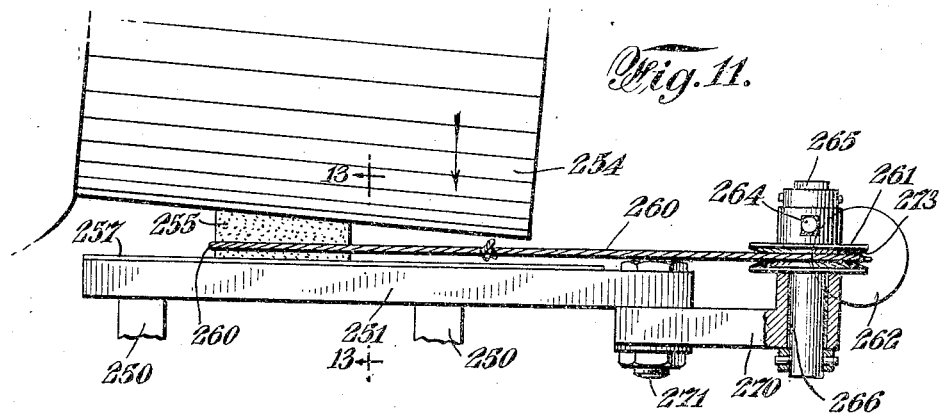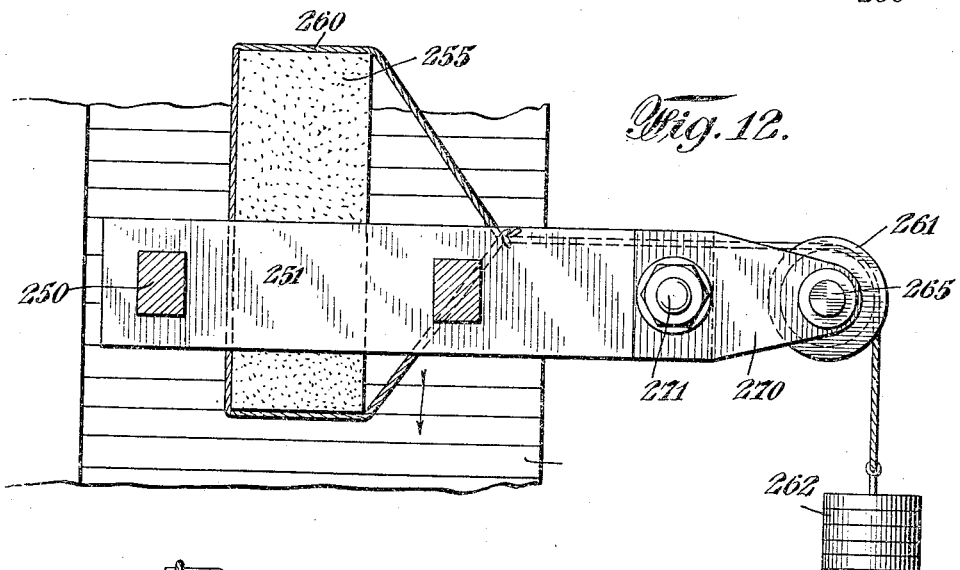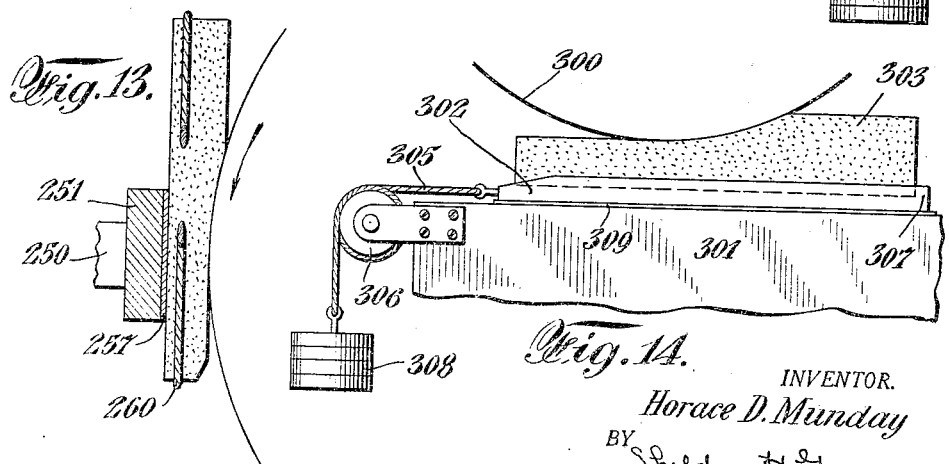
INVENTOR.
Horace D. Munday
BY
his ATTORNEY

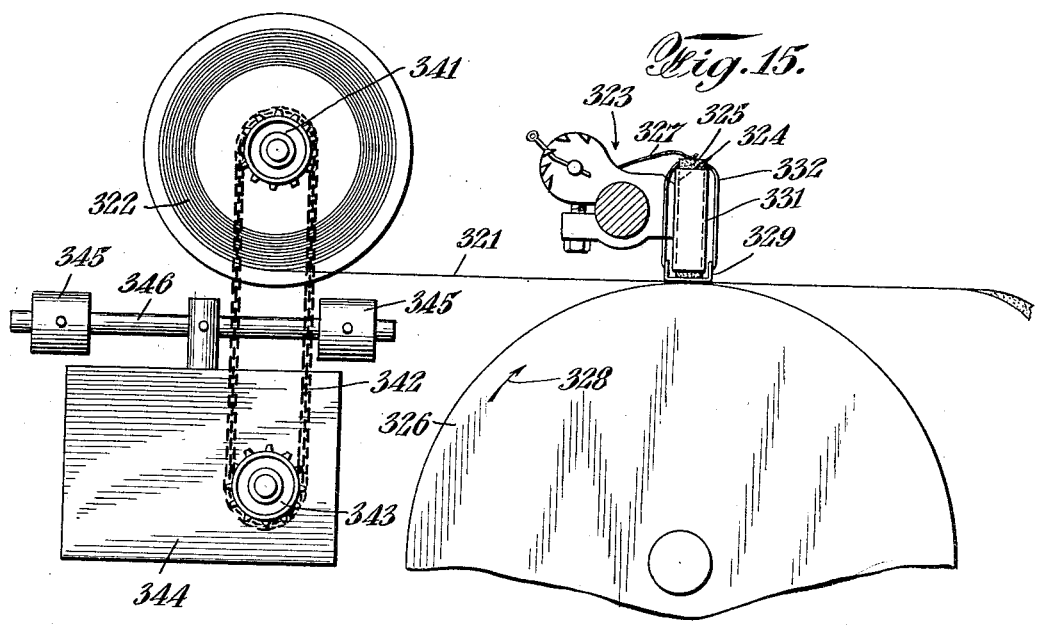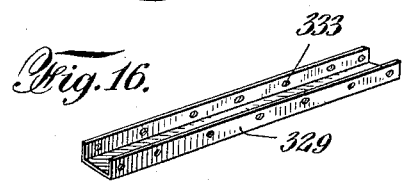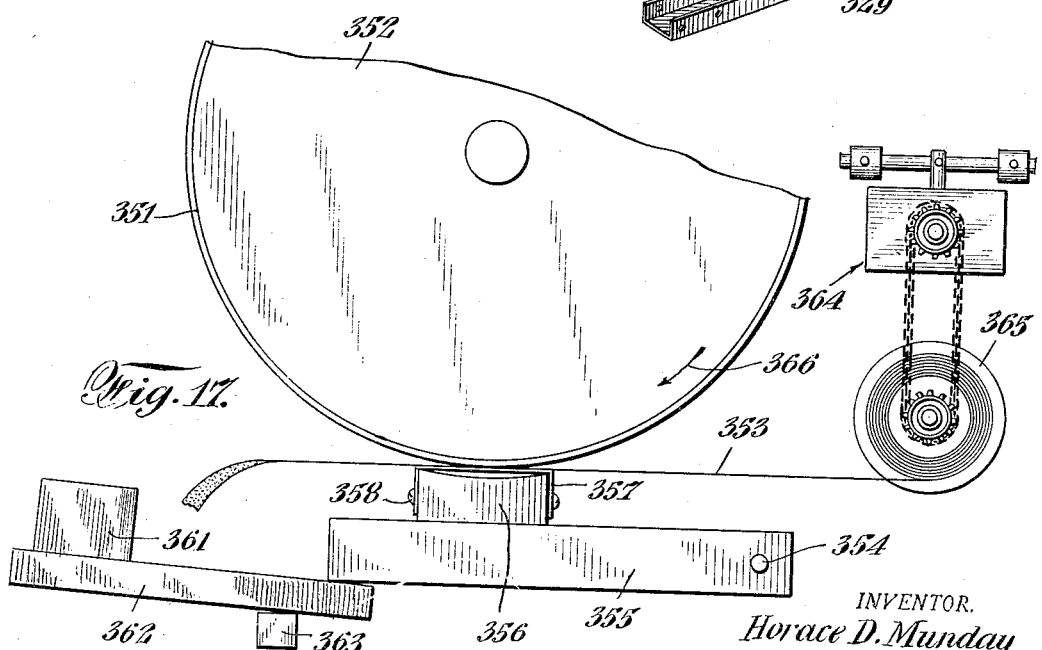

Patented Oct. 6, 1931

1,825,676

UNITED STATES PATENT OFFICE

HORACE D. MUNDAY, OF SCHENECTADY, NEW YORK

METHOD AND MEANS FOR TRUING COMMUTATORS

Application filed May 18, 1928. Serial No. 278,748.

This invention relates to methods of and apparatus for grinding and particularly to methods and devices for grinding or truing commutators or collector rings of electric machines.

It is the present practice to grind commutators or collector rings by means of a motor-driven abrasive wheel mounted on a cross feed slide carried by a carriage which in turn is mounted on a pair of ways parallel to the commutator, means being provided to give the abrasive wheel an axial movement relative to the commutator. One disadvantage of the present practice, as carried out by the device just described as well as similar devices now in use, is that the attention of the operator is required throughout the grinding operation. Another disadvantage of this practice is that, generally, it is necessary to remove some of the brush holders or other parts of the machine in order to permit the entrance of the grinding wheel into contact with the commutator. Furthermore, during the grinding operation it is the general practice to take off all or some of the useful load of the electric machine. Also, the grinding operation as now performed consumes a considerable time and as a result it is not usually performed as often as it should be.

By the use of the preferred forms of the present invention I avoid the disadvantages incident to present practice as above noted. My improved grinding device is automatic and requires little or no attention during actual operation. In using many forms of my invention it is unnecessary to remove any of the brush holders or other parts of the machine, and it is also unnecessary to take off any of the useful load from the machine.

A further important advantage of the devices constructed in accordance with the present invention is its adaptability to the truing of commutators having ridges or ruts as well as greater effectiveness in truing such commutators. When a commutator is ground by an abrasive block which is fed forward toward the commutator in a general radial direction, there is very little more grinding of the ridges of the commutator than the ruts or other "low" parts of the commutator. When the abrasive is first brought into contact with the commutator it contacts with the ridges only and for a short time the ridges are ground down to the exclusion of the remaining parts of the commutator. This condition, however, is of very short duration because the ridges quickly wear a groove in the surface of the abrasive and further advance of the abrasive results in contact of the abrasive with the "low" parts between the ridges of the commutator surface. Thereafter the low parts are ground down as fast as the ridges, and continued grinding has no further effect in reducing the ridges.

By the present invention I avoid the disadvantages just noted and provide a grinding device which will serve to grind down the ridges continually until they are eliminated. This result I accomplish by providing an abrasive of such a form and advancing the abrasive in such a way that the abrasive material of unworn contour is continually presented to the surface of the commutator. In the preferred form of my invention the abrasive member is in the form of block or plate or in the form of a wheel, and the member is moved in each case in a direction tangentially of the commutator, that is, the unworn abrasive material approaches the commutator in a tangential direction. In this manner, grinding away of the ridges of the commutator is much greater than the grinding away of the ruts of the commutator and when the abrasive shaving, worn away in the tangential passage of the abrasive across the commutator, is made quite thin practically all of the grinding away of the commutator may be on the ridges until the ridges have been very nearly cut down to the level of the ruts.

In my copending application, Serial No. 278,747, filed May 18, 1928, I describe a commutator grinding device which comprises an abrasive block and means for advancing the block toward the commutator and along the commutator. Such means, as disclosed in said application, includes means for hindering the motion of the abrasive in such a way that the abrasive is pressed with greater force against the higher parts of the commutator than against the low parts such as the ruts between the ridges or the flat spots of the commutator, with the result that the grinding device automatically eliminates the flat spots and ruts in the commutator. In said application mention is made of a grinding wheel as one form of an abrasive member which may be employed in the grinding device there disclosed. Such a wheel, when used as the abrasive member in such a device, is fed toward the commutator by a slowly rotating movement and will serve to eliminate the ridges and ruts in the commutator as well as to eliminate flat spots.

Numerous objects and advantages other than those above noted will be apparent from the following description taken in connection with the accompanying drawings which shows certain other forms of my invention and wherein:

Figure 1 is a diagrammatic view illustrating the manner in which an abrasive wheel may be employed in accordance with the present invention to true a commutator and in particular to eliminate ridges and ruts in the commutator surface.

Figure 2 is a side elevation of one form of grinding device embodying my invention, the device having an abrasive wheel which is used in a manner similar to that illustrated in Figure 1.

Figure 3 is a sectional view taken on the line 3—3 of Figure 2.

Figure 4 is a view similar to Figure 3, but showing a modification.

Figure 5 is a sectional view taken on the line 5—5 of Figure 4.

Figure 6 is a view showing a modification in which a block is employed as the abrasive member and in which one of the brush holders of the electric machine is employed as a supporting and feeding means for the abrasive block.

Figure 7 is a view similar to Figure 6, but showing a modification.

Figure 11 is a plan view of a still further modification.

Figure 12 is a side elevation of the structure shown in Figure 11.

Figure 13 is a sectional view taken on the line 13—13 of Figure 11.

Figure 14 is a side elevation of a still further modification.

Figure 15 is a view showing a modification in which a flexible strip or ribbon is employed as the abrasive member and in which certain of the brush holders of the machine are employed for holding and pressing the abrasive strip against the commutator.

Figure 16 is a perspective view of one of the parts shown in Figure 15, and

Figure 17 is a view similar to Figure 15 but showing a still further modification.

Figure 8:
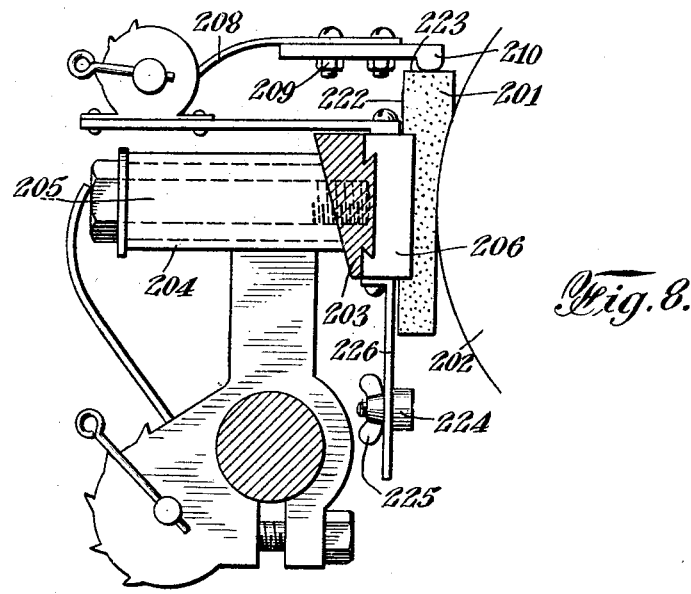
Figure 8 is a view similar to Figures 6 and 7, but showing another modification.

Referring to Figure 1, 10 represents an operation on a rotating commutator having a ridge 11 extending around its periphery. Reference character 12 represents an abrasive wheel mounted to rotate on an axis parallel to that of the commutator. In grinding the commutator the abrasive wheel 12 is first pressed against the surface of the commutator until the commutator has worn away a portion of the abrasive wheel, of a thickness indicated by the line $a$ in Figure 1, of say $\frac{1}{16}$ inch. The abrasive wheel is then rotated slowly, preferably in the same direction as the direction of the rotation of the commutator, as indicated by the arrows in Figure 1. As the wheel 12 rotates the ridge 11 wears a groove in the periphery of the wheel, but due to rotation of the wheel there is constantly being fed to the commutator abrasive material of unworn contour, namely, the abrasive material at that part of the wheel indicated in Figure 1 by reference character $b$.

Figures 2 and 3 show one practical embodiment of the present invention wherein an abrasive wheel is rotated by means of a weight and the rotation is hindered by means of a viscous substance, such as asphalt.

The abrasive wheel 20 shown in Figures 2 and 3 is as long as or longer than the commutator 21 and is formed of a series of wheel sections 23 mounted on an arbor 24. The arbor 24 is mounted on limbs 27 and 28 of a U-shaped bracket having a threaded stud or stem 30 splined by a capscrew 32 in a block 33. Block 33 is notched at 34 to receive an annular tongue 36 of a brush holder yoke 28 to which the block 33 is secured by a strap 39 and capscrews 41 threaded into the block. On the stud 30 is threaded a hand wheel 44 which, by means of its grooved hub 45 and set screw 46 is held in rotative engagement with the bore of the block 33.

On the outer end of the arbor 24 is mounted a worm wheel 50 adapted to be driven by a worm 51 carried by a shaft 52 mounted in bearings 54 in the horizontal part of an L-shaped plate 56. Plate 56 is attached to the bracket limb 28, between the limb and wheel, by capscrews 57. On the outer end of shaft 52 is a pulley 60 around which is wrapped a cord 61 extending to the driving weight 62 to which it is secured.

To hinder the rotation of the grinding wheel there is mounted on the shaft 52 a pair of telescopic tubes 65 and 66, and the clearance space between these tubes is filled with a film of viscous material 67, such as asphalt. The inner tube is secured to the shaft 52 by set screws 70, while the outer tube is secured by the clamp 71 to the plate 56.

The arbor 24 may be rectangular or hexagonal in cross section and the openings in the wheel sections 23 of similar form so as to eliminate possibility of the wheel sections turning on the arbor.

An electric lamp 75 is provided for controlling the viscosity of the asphalt 67 so as to control the speed of rotation of the grinding wheel 20 under influence of the weight 62. The lamp 75 is so positioned that the rays are directed against the tube and the amount of heat generated by the lamp is controlled by the rheostat 78 in the lamp supply circuit 79.

Strap 80, having an eye 81 in one end through which the cord 61 presses, is designed to make the cord 61 pull tangentially on the drum 60 regardless of whether the apparatus is mounted on top of the commutator or on the side.

In operation, with the armature rotating, the hand wheel 44 is used to bring the abrasive cylinder or wheel 20 into contact with the commutator 21. While this is being done the weight 62 may be detached, if desired, so that the abrasive cylinder will not rotate. The hand wheel 44 is slowly rotated for a few minutes until at flat spot, say $\frac{1}{16}$ of an inch deep, is worn by the commutator in the abrasive wheel 20 and then capscrew 32 is set up tightly. The weight 62 is then attached and the device allowed to work automatically for one revolution of the abrasive wheel. If the commutator has not been substantially trued in one revolution or less of the abrasive wheel, the wheel sections 20 may be taken out and trued up with a diamond or, if desired, one of the thinner sections of the wheel may be changed from the right hand to the left hand of the arbor so that the ridges and ruts of the wheel will no longer register respectively with the ruts and ridges of the commutator.

The abrasive wheel when operated in the manner above described operates to eliminate flat spots in the commutator as well as ridges and ruts. Due to the hindering effect of the asphalt, part of the abrasive wheel in contact with the commutator does not immediately advance into a low spot as the low spot passes continually the abrasive wheel, with the result that there is a tendency to hurdle the low spot. Because of this hurdling action the high parts of the commutator are ground down more rapidly than the low parts, with the result that the flat spots are ultimately eliminated.

In the modification shown in Figures 4 and 5 the method of mounting, rotating and radially advancing the abrasive wheel 90 is substantially the same as that used in the modification shown in Figures 2 and 3. Only one abrasive wheel is used however, and, in addition to means of rotating it, there is also means of both rotating it and at the same time giving it an axial movement along the commutator. The abrasive wheel 90 is mounted on the bushing 91 to which it is secured by setting up the nut 92, the hexagonal shoulder 94, against which the abrasive wheel 90 abuts, being integral with the bushing 91.

The bushing 91 may engage the arbor 96 in one of several ways. This arbor has both an axial keyway 98 and a spiral keyway 99. The axial keyway is relatively deep and slidably mounted in this keyway, is the key 100, only the end portions 101 and 102 of which project above the surface of the arbor 96. The middle or main part of this key, that is, that part within the bore of bushing 91, is not only below the surface of the arbor 96 but it is also slightly below the bottom of the spiral keyway 99. To the end 101 of the key 100 is tied one end of the cord 104 which passes over pulleys 105, 106, 107, 108, 109 and 110, the other end of the cord being tied to the other end 102 of the key 100. The pulley 108 is integral with the outer tube 114 of a pair of telescopic tubes, the inner tube 115 being clamped to the arbor 96 by means of the clamp 118 compressing the slotted end of said inner tube against the arbor 96. Between the tubes is a coating of a viscous substance 120, such as asphalt, filling the clearance space between the two tubes.

To rotate the outer tube there is a weight 122 to which is attached the end of a cord 124, several turns of the cord being taken around the tube 114 to which the other end of the cord is secured. It is evident that when the weight 122 descends the abrasive wheel is drawn axially along the commutator 125.

To cause the abrasive wheel to rotate when it is being drawn axially along the commutator there are two setscrews 130 in the bushing 91 which engage the spiral keyway 99. The inner ends of these set-screws are conical, the spiral keyway being also preferably conical in section. With these two set-screws in engagement with the spiral keyway 99 it is evident that the abrasive wheel 90 will rotate when it is moved axially along the commutator. It is evident that two set-screws, instead of one, will prevent the bushing from losing engagement with the spiral keyway and making engagement with the axial keyway at the points where the two paths cross. If both keys make engagement with the axial keyway there would be no motion of rotation given to the abrasive wheel when it is moving axially. Collar 132 on the reduced end of the arbor 96 prevents axial movement of the arbor. Bearing caps 135 can be tightened up by the screws 136 to prevent rotation of the arbor 96.

To rotate the abrasive wheel without any axial movement there is a worm-wheel 140, worm 141, an actuating weight 142 and a pair of telescopic tubes 144 and 145 with asphalt between them to hinder the motion of the weight—all essentially the same as shown in the preceding form shown in Figures 2 and 3. To tighten the cord 104 the spindle 146 of the pulley 109 is vertically adjustable in the slot 148 in the plate 149 attached to the U-shaped bracket limb 150 by the screws 151. Portions of the cord 104 passing on and off the pulley 109 to the right of said pulley pass through the eyelet 153 threaded into the plate 149. By this means the cord is kept from running off the pulley 109.

Electric lamps 157 and 158 serve to control the viscosity of the asphalt hindering means, as previously explained for the former modification. Hand-wheel 160 is used to bring the abrasive wheel into contact with the commutator preparatory to automatic operation.

Clamp 165 limits movement of wheel 90 axially.

The operation of this modification is easily understood. Suppose that it is desired to grind out the ridges in a commutator. Hand-wheel 160 is manipulated to bring the abrasive wheel 90 into contact with the commutator 125, and then more slowly manipulated to further advance the abrasive wheel till the commutator has worn away a spot in the abrasive wheel to a depth of, say, $\frac{1}{16}$ inch. Cap-screws 162 are set up. The set-screws 130 are then placed in the proper pair of holes to cause them to register with and engage the spiral keyway 99. Screws 136 are set up to clamp the bearing caps 135 tightly to the arbor 96. The weight 122 is then put into action and the electric lamp 157 adjusted to control the viscosity of the asphalt hindering means, thus determining the speed of motion of the abrasive wheel.

To grind out a particular ridge or cut a "neck" in the inner end of the commutator the set-screws 130 are set up as far as possible, thus locking the bushing 91 to the arbor 96.

Screws 136 are then loosened up until the arbor will rotate freely in its bearings. Weight 122 and cords are then removed and weight 142 put into action. The electric lamp 158 is then properly adjusted to control the viscosity of the asphalt between the tube 144 and tube 145. By this means the abrasive wheel 90 will rotate but will have no axial movement.

Should an axial movement without rotation be desired, the set-screws 130 can be set to register with the keyway 98.

In Figure 6 is shown a brush holder 170 used as a spacing member to direct the advancement of the abrasive block 171 toward the commutator 172. The abrasive block 171 is drawn between the brush holder box 173 which acts as a guide and the commutator 172 by the cord 174 with loop 175 around the abrasive block and lying in a slot 176 for security. The cord 174 passes around the brush holder stud 176 through the hole 177 at the end of rod 178, the other end of the cord being tied to the pressure finger 179 of the brush holder. The rod 178 is fastened to the brush holder shank by the screw 180. In some brush holders the pressure finger can be thrown back 180° or more; in such cases the end of the cord may be tied directly to the pressure finger without being threaded through the hole 177.

In putting the device shown in Figure 6 into operation the entering end 181 of the abrasive block 171 is ground to a taper so that the end of the abrasive will pass between the commutator and the brush holder. However, the angle at the end of the wedge should not be less than about 8 to 10° if the commutator rotates in the direction of motion of the abrasive block as otherwise the abrasive block may be pulled through by rotation of the commutator. Just how sharp to make the working angle of the abrasive depends partly on the condition of the commutator and what it is desired to accomplish. If the working angle of the abrasive block is not greater than 20 to 25° there is a tendency for the abrasive block to cling to the commutator and to the brush holder. If the angle is sufficiently sharp the cord 174 may be dispensed with without risk of the abrasive block falling out, especially if the brush holder selected is on the side of the commutator so that the weight of the abrasive as well as the friction of the commutator will tend to keep the abrasive block in position. The working angle of the abrasive block is taken as the angle between the axis of the block and the chord be connecting the extremities of the arc of contact of the abrasive block with the commutator. When the block is being worked in the clinging zone angle dependence may be made on the slight yielding of the brush holder and the brush holder stud to take care of the slight radial motion of the abrasive block as it moves from a flat spot in the commutator to a high spot in the commutator, the flat spot in this case being assumed to be not very deep.

In the modification shown in Figure 7 the brush holder 190 has been moved back slightly from its normal position relative to the commutator 191 and a notched fibre or wood block 192 placed under the brush holder, the notch 193 coming under the brush holder box 194 and thus serving to hold the block in position. Further security is given by the brace 189 between the brush holder box and fibre block. The abrasive block 195 in this modification is of curved form. The fibre block 192 prevents the corner of the brush holding box from gouging out shoulders in the abrasive block, which might cause irregularity in the advancement of the abrasive block. The fibre block 192 also protects the bottom of the brush holder box against wear by the abrasive block. The fibre block also serves to make a relatively smooth wall for the passageway between the brush holder and commutator, thus tending to make the movement of the abrasive block 195 along the passageway even and regular. A strip of tin or leatheroid paper attached to the back of the abrasive block 195 may be substituted for the fibre block 192.

If desired, the viscous hindering means such as asphalt may be used between the adjacent surfaces of the abrasive block 195 and the fibre block 192, the fibre block also serving to protect the brush holder box 194 from contact with the sticky asphalt. A cloth ribbon 196 pasted on the outer surface of the abrasive block will keep the abrasive block from becoming smeared with asphalt.

A cord 197 is tied to the end of the ribbon 196 at the forward end of the abrasive block; the cord then passes over another brush holder stud or other stud 198, this stud acting as a substitute for a pulley. The cord 197 is attached to a weight 199, this weight acting through the cord and ribbon to advance the abrasive block 195.

Hindering means of the delaying type, that is, where a time element is involved, and of which a viscous substance, such as asphalt, is a particular example, are particularly applicable when it is desired to have only a thin shaving of the abrasive block 195 worn away in its passage between the fibre block 192 and the commutator 191, for with only a small shaving of the abrasive block being worn off the resulting angularity of the abrasive block may not be great enough to prevent the commutator from gripping the abrasive block and jerking it through the passageway between the fibre block and the commutator. It is desirable, when ridges or other than flat spots are to be eliminated, to have only a thin shaving of the abrasive block worn away in its passage between the fibre block and the commutator. When only a thin shaving of the abrasive block is being worn away in one passage the abrasive is grinding on the ridges and not on the ruts. On a second passage the abrasive block may be slightly shifted axially along the commutator, thus bringing the unworn or less worn parts of the abrasive block into contact with the ridges of the commutator. The same result may be accomplished by reversing the abrasive block. With a curved form of the abrasive block there is less chance, in certain cases, of the abrasive moving so as to strike the rear part of the brush holder. Where adjacent brush-holder studs are close together the abrasive block may be so long that it will span the space between brush holders on adjacent studs; a curved abrasive block will pass under adjacent brush holder studs, while a straight block might not. Where the commutator rotates against the movement of the abrasive member there is of course no danger of a small angled abrasive member being carried through between the brush holder and commutator.

Figures 9, 10:
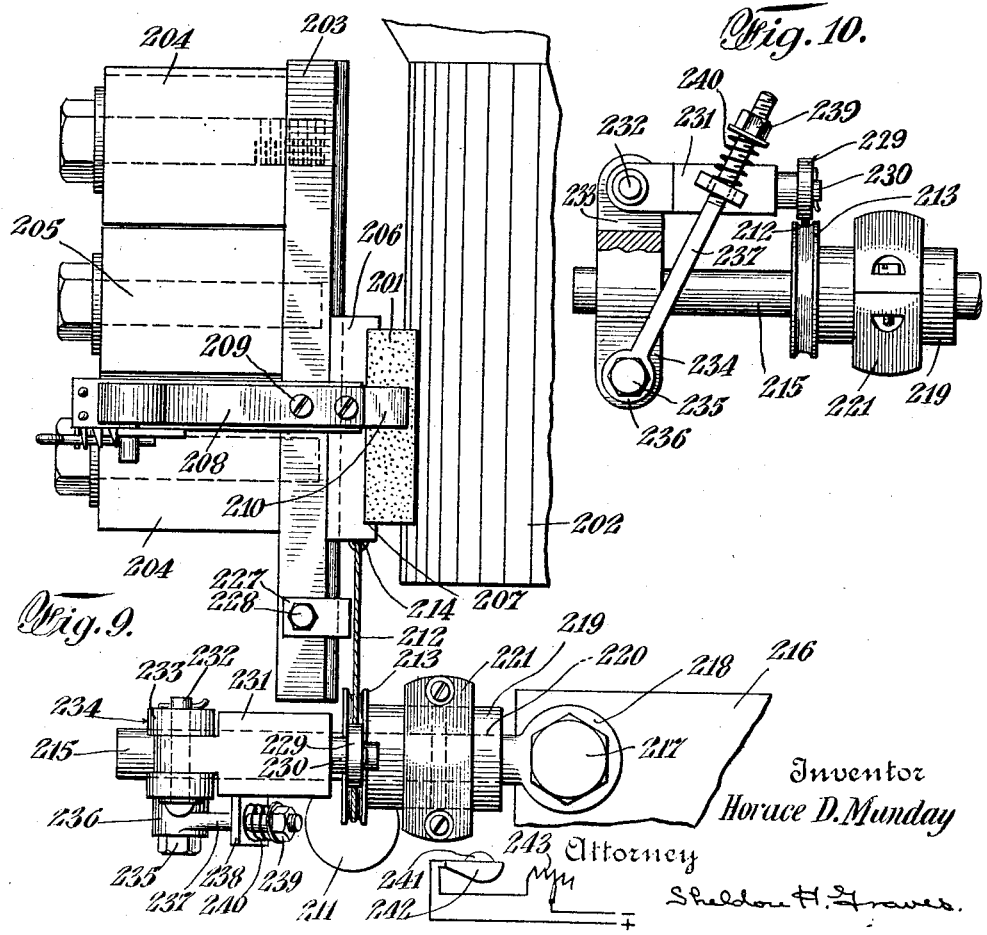
Figure 9 is a top plan view of the structure shown in Figure 8.
Figure 10 is an end elevation of the structure shown in Figure 9.

In the modification shown in Figures 8, 9 and 10 the abrasive 201 can be drawn axially along the commutator 202, thus cutting down the commutator ridges; or the abrasive movement may be only tangential, thus truing up a flat spot in the commutator equal to the axial length of the abrasive; or, if desired, both movements may be made to occur simultaneously.

As shown in Figures 8, 9 and 10, a guide or pair of ways 203 is attached to the inner ends of a row of brush holder boxes 204, 203 being secured thereto by cap-screws 205 through the brush holder boxes.

The brush holders are thrown back slightly from the commutator to provide space. Slidably mounted on the pair of ways 203 is the slide 206 which is capable of axial movement along the commutator 202. In the slide 206 is the groove 207 in which is slidably mounted the abrasive block 201, slidably actuated, tangentially to the commutator, by the spring 208. Secured to the outer end of this spring by the screws 209 is the wood or fibre tip 210, which engages the end of the abrasive 201. The abrasive block is moved axially by the weight 211 attached to one end of a cord 212 running over the pulley 213 to the slide 206, to which is secured the other end of the cord 212 by the screw 214. The pulley 213 rotates on the rod 215 which is secured to the bearing 216 by the cap-bolt 217 through the expanded and apertured end 218 of said rod. On the rod 215 is also the collar 219, there being a coating of asphalt or other viscous substances 220 between the rod and the bore of the collar. The collar 219 and the pulley 213 may be optionally connected by the strap 221. When the strap 221 is in operative position connecting the pulley 213 to the collar 219, the motion of the pulley 213, and therefore of the abrasive 201, is hindered by the asphalt 220. When the strap 221 is disconnected there is of course no hindering from the asphalt, but there still remains the hindering of the radial movement of the abrasive member by the yielding of the brush holders and brush-holder stud and brush-holder yoke, due to the inherent structural weakness of these members. In case the angle of the abrasive member is so large that the abrasive moves back and forth tangentially to the commutator as the high and low spots of the commutator alternately come under the abrasive, then the wedge form of the abrasive itself will constitute the hindering means. In case the angle of the abrasive member is as small as 8 to 10° or smaller, with the commutator rotating with the abrasive instead of against it, then the application of hindering means of the delay type to hinder the tangential motion of the abrasive member is advisable. A coating of asphalt 222 applied to the outer face of the abrasive member will serve to hinder its motion in the slide, the surface of the abrasive having preferably been made impervious to the asphalt by cementing to the brasive a strip of paper or cloth 223 to receive the coating of asphalt.

To limit the tangential movement of the abrasive there is a short bolt 224, against the head of which the abrasive strikes and stops. This bolt 224, by means of the thumb-screw 225 is adjustable in a slot in the strap 226 attached to the slide 206. To limit the axial movement of the abrasive there is the clamp 227 movable to any position along the guide 203 by the cap-screw 228.

When the asphalt 220 is put into action by clamping the clamp 221 to the collar 219 and the hub of the pulley 213, it is necessary, in order to secure all the asphalt hindering effect, to prevent the cord 212 from slipping on the pulley 213. One way to accomplish this is by means of an idle pulley 229 fitting into the groove in pulley 213 and yieldingly pressed against said pulley 213, the cord 212 being pinched between the rims of the two pulleys. The idle pulley 229 rotates on the spindle 230 integral with the member 231 swivelly attached by the pin 232 to the member 233, the lower part of which is in the form of a hub 234 attached to the rod 215 by the cap-screw 235, which also swivelly secures the eyed end 236 of the screw 237 diagonally extending upward through the apertured lug extending from the member 231. Between the nut 239 and the lug 238 is the spiral spring 240 which is compressed when the said nut is tightened, thus pressing the idle pulley 229 harder against the cord 212.

Variation in the amount of heat received from the lamp 241 will modify or control the viscosity of the asphalt 220, which in turn will modify or control the axial movement of the abrasive 201. The amount of heat received by the asphalt 220 may be modified in different ways, such as by the distance of the lamp from the asphalt, or by the variable interposition of a screen, such as the lamp shade 242, or by current control means, such as the rheostat 243. The viscosity of the asphalt 222 may be controlled by a similar lamp.

Another modification is shown in Figures 11, 12 and 13. Clamps 250, only portions of which are shown, attach the spacing member 251 to the brush-holder support. This spacing member is slightly out of parallelism with the axis of the commutator 254 and is positioned at the side of the commutator that is moving downwards. The abrasive member 255 in wedge form is positioned between the spacing member 251 and the commutator; if the wedge angle of the abrasive member is rather small, the inner face of the spacing member may have a friction lining 257 to prevent the abrasive member from passing entirely through the space between the spacing member and the commutator. To propel the abrasive member axially the bight of the cord 260 is looped over the abrasive wedge, running thence over the pulley 261 to the actuating weight 262. The pulley is optionally securable by the set screw 264 to the pulley pivot 265, the other end of said pivot having between it and the bore of its support a coating of asphalt 266. When the set-screw 264 on the pulley hub is tightened up the asphalt coating is brought into action to exert its hindering effect; if the set screw 264 is loose, the pulley 261 turns freely on the pivot 265, and the hindering effect of the asphalt coating is avoided. The angle of the abrasive wedge should preferably be of a size to make the abrasive cling to the commutator. If the angle of the abrasive wedge is larger than this, the pulley 261 may be positioned somewhat below the plane of the spacing member 251 so that the weight will exert a slight downward pull, in addition to its axial pull to make the abrasive cling to the commutator.

Corresponding to the above explained action of abrasive blocks with an initial or acquired general wedge form in passing through or clinging, or not gripping at all, when positioned between a rotating commutator and a spacing member, an abrasive wheel rotatable on a spindle—a spacing member—if advanced against a rotating commutator, may tend to rotate rapidly, or to cling and rotate slowly, or not to rotate at all.

To enable the pulley 261 to be positioned below the plane of the spacing member 251 the pulley is mounted on the end of a short arm 270 angularly adjustable and securable by the cap bolt 271 to the outer end of the spacing member 251. The angle of the V- shaped groove 273 in pulley 261 is sharp enough to prevent slipping of cord 260 even if the inner end of said cord is not taut.

The operation of this modification is easily understood. The abrasive wedge 255 is inserted in the space between the spacing member and the commutator at the inner end of the commutator, where the spacing member 251 is at the greatest distance from the commutator. As the abrasive wedge is drawn axially along the length of the commutator it is worn away but at the same time the body of the abrasive wedge moves nearer to the commutator as it approaches the outer end of the commutator because the spacing member is nearer to the commutator at the outer end. These two movements tend to counteract one another, that is, the bodily approach of the abrasive to the commutator tends to make up for the wear on the active face of the abrasive wedge. If, however, the active face of the abrasive wedge wears off faster than the bodily approach of the abrasive wedge to the commutator, then the abrasive wedge will move downward tangentially far enough to make up for the excess. The position of the weight 262 on the cord may be so adjusted that the weight will just about touch the floor at the time that the abrasive wedge passes off the end of the commutator.

In the explanation of the operation of this modification it was assumed that the commutator rotated in a direction to carry the abrasive member through, between the spacing member and the commutator. The commutator may, however, rotate in the opposite direction if desired, a weight suspended by a cord from the abrasive member in working position may be used to keep the abrasive member in working position; or the pulley 261 may be positioned somewhat below the level of the spacing member 251 so that the weight 262 may exert a downward pull as well as axial pull on the abrasive member to keep it in working position.

In Figure 14 is shown another simple modification. This modification is particularly adapted for rapid work. Bolted to the frame of foundation under the commutator 300 is the timber 201. Slidably mounted on the upper side of this timber is the shoe 302 holding the abrasive block 303, said shoe 302 being actuated tangentially by the wire 305 attached thereto and leading to the fixed shaft or fixed pulley 306 around which it is wrapped one turn more or less to the weight 308. A friction lining 309 may be used under the shoe 302 if desired, as insurance against backward slipping of the shoe 302. Additional insurance against slipping is given by the one turn more or less of the wire around the fixed shaft 306. Even if the wire runs over a rotatable pulley instead of over a fixed shaft, the friction of the shoe 302 on the timber 301 would be sufficient to true up a commutator. On the other hand, even without any friction between the shoe and the timber the difference of pressure on the low spot and the high spot of the commutator caused by the one turn more or less of the wire wrapped around the fixed shaft would be great enough to true up a commutator. This arrangement is in fact a kind of snubbing post in which the reaction pressure of the low spot of the commutator on the abrasive stops the downward movement of the weight; while the upward movement of the weight is caused by the reaction pressure of the high part of the commutator on the abrasive. Since much more pressure is required to move the weight upwards than to prevent it from moving downwards, it is evident that the high parts of the commutator will be subjected to a much greater abrasive action than will the low spots. Consequently the commutator will finally become true. To make this snubbing arrangement more effective the wire 305 should be short and straight or free from kinks. With ¾ of a turn of the wire around the fixed shaft and an assumed coefficient of friction of 25% the ratio of the pressure required to move the weight upwards is ten times the pressure required to stop the movement of the weight downwards. The difference of abrasive action on the high and low spots of the commutator caused by this disparity of pressure is amply sufficient to true up a commutator. With one complete turn of wire around the fixed shaft the ratio of the pressures rises approximately to 23, considerably more than enough to true up a commutator.

In moving an abrasive block tangentially against a rotating commutator to grind down ridges therein, the thinner the abrasive shaving worn off by the commutator the more efficiently the abrasive is used up to the point or degree of thinness where the abrasive ceases to touch the low parts of the commutator. Where the height of the ridges is such that only a very thin abrasive shaving need be worn off, this can be secured by the use of sandpaper or carborundum cloth, preferably in the form of a ribbon which may be as wide as the commutator is long. A sandpaper ribbon may be used to grind down ridges of very small height, leaving practically untouched the low parts or ruts of the commutator.

In using an abrasive ribbon to grind a commutator I employ some means of pressing the ribbon against the commutator. I also employ some means of feeding the abrasive ribbon between the pressure member and the commutator. If the abrasive ribbon is drawn against the rotation of the commutator, a small motor with speed reducing gears may be used to rotate a reel on which the abrasive ribbon is wound. If the abrasive ribbon moves with the rotation of the commutator, the small motor may be omitted, the friction of the commutator serving to draw the abrasive ribbon along; in this case some means of hindering the rotation of the reel should be used—such as a clock escapement mechanism. If the commutator runs in either direction, a small motor should be used to wind up one end of the ribbon, while the unwinding of the ribbon on the other roll is hindered by the clock escapement mechanism or other delaying means.

Since the abrasive ribbon is flexible, it may make contact with the commutator over a considerable peripheral span, if the pressure member has its active end in an arc conforming to that of the commutator.

The pressure member may press steadily or differentially with delayed action. Where there are no flat spots in the commutator, it being desired to grind only ridges, a steady pressure may be used. If it is desired to grind out flat spots, a differential pressure or delayed action pressure may be employed; or a positive feed may be used, or a positive feed with delayed action.

Figures 15 and 16 show a modification having the features just described. The abrasive member, or sandpaper ribbon 321, is unwound from a reel 322, passing thence under some or all of a set of brush holders 323, from which the brushes have been removed and wooden blocks of the same dimensions substituted. Each block is divided into two parts of wedge form 324 and 325, thus a differential pressure of the abrasive ribbon against the commutator 326 is given by the block when advanced by the pressure finger 327; that is, less pressure will be required to stop the advance of the block into the low part of the commutator than will be required by the high part of the commutator to shove the wooden block backwards.

This is due to the friction between the wedges 324 and 325 and the sides of the brush-holder box. Such friction resists all motion of the wedges, either toward or away from the commutator. When a low spot of the commutator passes under the brush holder, the spring moves the wedges through the box toward the commutator until the strip 321 is pressed against the commutator surface. As it is apparent that the friction above mentioned is opposing the action of the spring 327, the pressure of the strip on the commutator at the low spot will be the difference between the force of the spring and the opposing friction. In other words the pressure of the strip on the low spot will be considerably less than the force of the spring 327. On the other hand, when a high spot comes under the brush holder and as a result the strip 321 and the wedges are pushed back, the force which must be exerted by the commutator to cause this backward movement must be one which will overcome the friction of the wedges against the brush holder box and in addition it must overcome the pressure of the spring 327. In other words the pressure between the abrasive strip and the commutator, as a high spot of the commutator is coming under the brush holder is considerably greater than the pressure of the spring 327. The result therefore of the use of the wedges 324 and 325 is to cause greater abrasion of the high spots than the low spots.

To consolidate or unify the pressures of the individual blocks there is a trough or U-shaped member 329, made of horn fibre or leatheroid paper about $\frac{1}{16}$ or $\frac{1}{32}$ inch thick. This trough is slipped under the brush holder boxes 331 and loosely laced thereto by the cords 332 passing through holes 333 and over the tops of the brush-holder boxes.

The friction of the commutator 326, rotating as indicated by the arrow 328, draws the abrasive ribbon from the reel 322 under the trough 329. The wooden blocks bear against the hollow part of the trough and force the trough against the abrasive ribbon and the ribbon against the commutator with a differential pressure that will grind out the flat spots. To permit a slow motion only to the reel 322, the gear 341 on the shaft of said reel may be belted by the chain belt 342 to the gear 343 driving the clock escapement mechanism 344, the speed being changed by adjustment of the weights 345 on the escapement arm 346.

Instead of the wooden block being cut into two parts, the solid block may be smeared with asphalt to give a delayed action; or both a divided block and asphalt may be used. Or the brushes may be left in and used without any friction or asphalt hindering means, bearing on the trough 329 or directly on the abrasive ribbon without the use of the trough; such a practice would eliminate ridges also flat spots, if there is considerable friction in the brush holder box.

Figure 17 shows how the ridge 351 in a commutator 352 may be ground down by means of a sandpaper ribbon 353. Swivelled at 354 is the timber 355 having block or step 356 hollowed out at the top, over which top is stretched the canvas or leather strip 357 secured at its ends by the screws 358, said canvas strip pressing the passing sandpaper ribbon over a considerable peripheral span against the commutator 352. The weight 361 on the lever 362 on the fulcrum 363 raises the end of the timber 355 and presses the sandpaper ribbon against the commutator 352. The speed of passage of the sandpaper ribbon is controlled by the clock escapement mechanism 364 geared to the reel 365. The commutator rotates in the direction of the arrow 366.

If it is desired to grind out a flat spot in the commutator the canvas strip 357 may be omitted, the wooden block or step 356 pressing the sandpaper ribbon against the commutator. In this case the timber 355 may be raised with a differential pressure or with delayed action, or it may be raised positively or it may be raised positively but with delayed action.

Other forms of the generic invention herein illustrated are disclosed in my applications J, L, M, N, O, P and Q Serial Numbers 278,747 and 278,749 to 278,754, inclusive, all of even date herewith.

Having now described my invention, what I claim and desire to secure by Letters Patent is:

1. A grinding device for rotating commutators comprising an abrasive member, means for supporting and guiding said member and for advancing the active part thereof tangentially to said commutator at a speed which is relatively slow, said guiding means serving to hold said abrasive member in such a spaced relationship to said commutator that the depth of abrasive wear in its tangential passage across the rotating commutator is relatively large.

2. A grinding device for rotating commutators comprising a rotary abrasive member, means for supporting and permitting rotation of said member whereby the active part is advanced tangentially to said commutator, said supporting means serving to hold said member in such a spaced relationship to said commutator that the depth of the abrasive wear in a single tangential passage across the rotating commutator is relatively large.

3. A grinding device for rotating commutators comprising an abrasive member, means for supporting and guiding said member and for advancing the active part thereof tangentially to said commutator at a speed which is relatively slow, said guiding means serving to hold said abrasive member in such a spaced relationship to said commutator that the depth of abrasive wear in its tangential passage across the rotating commutator is relatively large, said supporting means permitting retrograde movement of the active portion of said member under reaction thrust of said commutator, and means for resisting said retrograde movement.

4. A grinding device for rotating commutators comprising a rotary abrasive member, means for supporting and permitting rotation of said member whereby the active part may be advanced tangentially to said commutator, said supporting means serving to hold said member in such a spaced relationship to said commutator that the depth of the abrasive wear in a single tangential passage across the rotating commutator is relatively large, said supporting means permitting retrograde movement of the active portion of said member under reaction thrust of said commutator, and means for resisting said retrograde movement.

5. The method of grinding a commutator so as to eliminate flat spots and ridges in the commutator surface by means of an abrasive block which method consists in pressing the block between the commutator and a guide in such a manner as to first wear an arcuate notch in the block and moving the block tangentially of the commutator so as to slowly wear back the shoulder formed by the notch.

6. The method of grinding a commutator so as to eliminate flat spots and ridges in the commutator surface by means of an abrasive wheel, which method consists in pressing the wheel against the commutator in a manner as to first wear an arcuate notch in the wheel and rotating the wheel so as to slowly wear back the shoulder formed by the notch.

7. A grinding device for rotating commutators comprising an abrasive member, means for supporting and guiding said member and for advancing the active part thereof tangentially to said commutator at a speed which is relatively slow, said guiding means serving to hold said abrasive member in such a spaced relationship to said commutator that the depth of abrasive wear in its tangential passage across the rotating commutator is relatively large, and delayed action means for hindering the advance of said member.

8. A grinding device for rotating commutators, comprising a rotary abrasive member, means for supporting and permitting rotation of said member whereby the active part may be advanced tangentially to said commutator, said supporting means serving to hold said member in such a spaced relationship to said commutator that the depth of the abrasive wear in a single tangential passage across the rotating commutator is relatively large, and viscous means for hindering the advance of said member.

9. In a dynamo electric machine having a commutator, a guiding member positioned adjacent to said commutator, an abrasive block, means for automatically passing the abrasive block slowly between the member and the commutator as the latter revolves.

10. In a dynamo electric machine having a commutator, means for truing said commutator, comprising an abrasive block, a guiding member positioned adjacent to said commutator at a distance from the highest parts thereof less than the thickness of said abrasive block, means for automatically passing said abrasive block slowly between said commutator and member, whereby the abrasive block grinds the high parts of said commutator exclusively or more than the low parts thereof, with the result that the commutator finally becomes substantially true.

11. In a dynamo electric machine having a rotating commutator with an eccentric surface, a device for truing said commutator, comprising a supporting member positioned adjacent to said commutator and at a predetermined distance therefrom, an abrasive member positioned between said rotating commutator and said supporting member, the said abrasive member being too thick to be quickly drawn past the rotating commutator by the friction thereof and yet thin enough to cling to said rotating commutator by reason of said friction urging said abrasive block to passage by said commutator.

12. In a dynamo electric machine having a commutator with an eccentric surface, a device for truing said surface, comprising a supporting member and guide positioned adjacent to said commutator and at a predetermined distance therefrom, an abrasive member positioned between said commutator and said supporting member and having a thickness in part greater than the shortest distance between said commutator and said supporting member, and, attached to said abrasive member by one end, a flexible connection and means for exerting a pull on the other end of said flexible connection to urge said abrasive member to passage between said commutator and said supporting member.

13. In a dynamo electric machine having a commutator with an eccentric surface, a device for truing said surface, comprising a supporting member and guide positioned adjacent to said commutator and at a predetermined distance therefrom, an abrasive member positioned between said commutator and said supporting member and having a thickness in part greater than the shortest distance between said commutator and said supporting member, and, attached to said abrasive member by one end, a flexible connection, an anchorage over which said connection passes and with which said connection is in frictional engagement, and means for exerting a pull on the other end of said flexible connection to urge said abrasive member to passage between said commutator and said supporting member.

Signed at New York in the county of New York and State of New York this 17th day of May A. D. 1928.

HORACE D. MUNDAY.